United States Patent Office 3,301,081
Patented Jan. 31, 1967

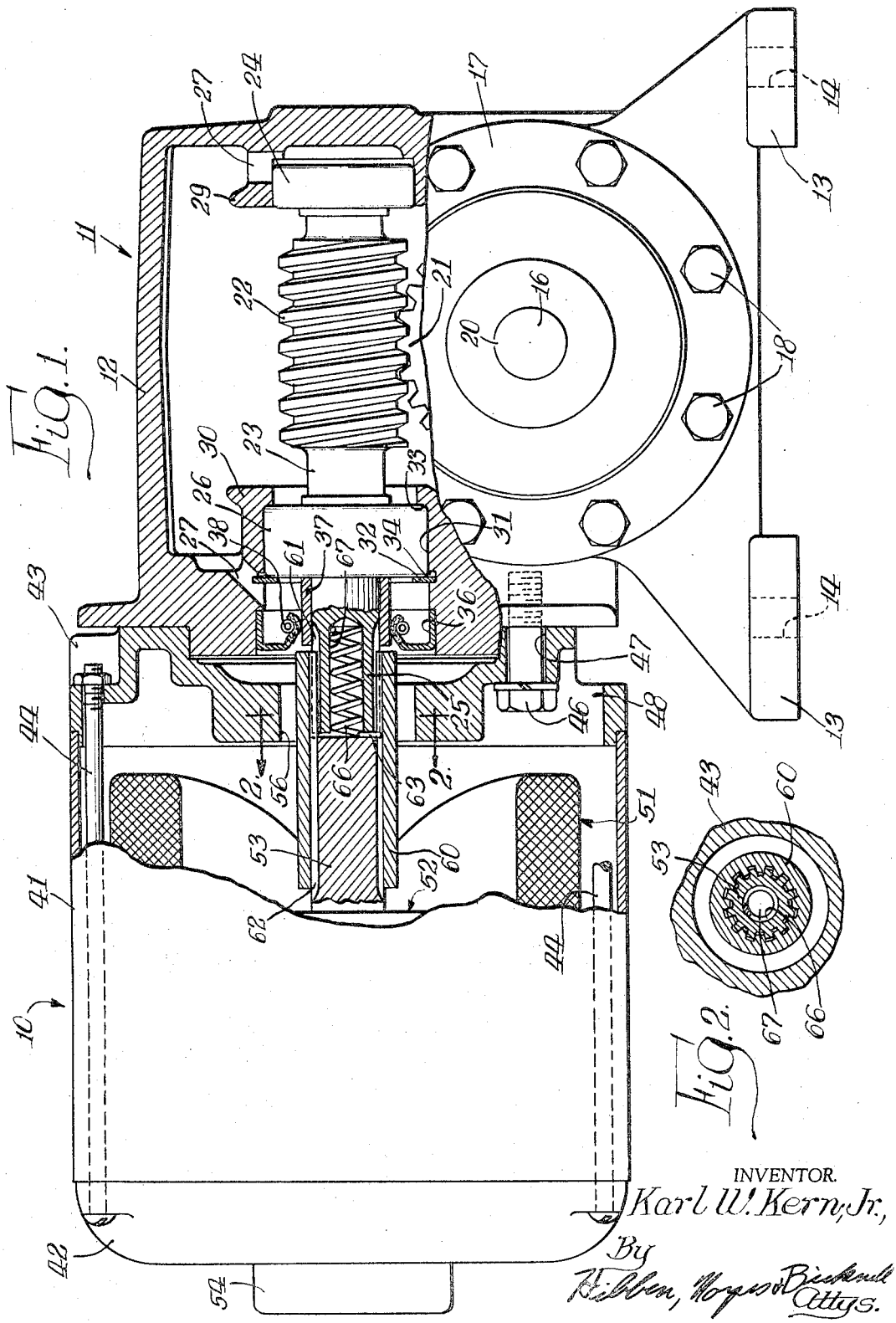

3,301,081
NOISE ELIMINATING COUPLING
IN GEAR UNIT
Karl W. Kern, Jr., Bluffton, Ind., assignor to Franklin Electric Co., Inc., Bluffton, Ind., a corporation of Indiana
Filed Feb. 25, 1964, Ser. No. 347,292
2 Claims. (Cl. 74—427)

This invention relates to apparatus for coupling two rotatable shafts together.

Rotatable shafts are frequently positioned in end-to-end relation and coupled together for simultaneous rotation. In a motor-gear box combination, for example, the motor unit and the gear box unit may have separate rotatably mounted shafts which are connected together by a coupling. Where the construction of the coupling and the bearings for the shaft permits some axial movement of one shaft relative to the other, the adjacent ends of the shafts may butt each other, which is considered undesirable because it may result in a chattering noise during operation.

Accordingly, it is an object of this invention to provide a novel construction including two rotatable shafts, and means for coupling the two shafts together for noise free operation.

It is another object of this invention to provide novel noise free apparatus in a motor-gear box combination for coupling the motor and gear shafts together.

Other objects and advantages will become apparent from the following description taken in conjunction with the accompanying figures of the drawing, in which:

FIG. 1 is an elevational view partly in section of a construction embodying the invention; and FIG. 2 is a fragmentary sectional view taken on the line 2—2 of FIG. 1, In general, a construction embodying the invention comprises a frame and two shafts rotatably mounted on the frame, the two shafts being positioned closely adjacent each other in end-to-end relation. The shafts are supported on the frame by bearings, and the bearings are such that they permit limited avial movement of at least one of the two shafts. Apparatus is provided for coupling the adjacent ends of the shafts together such that relative rotative movement of the two shafts is prevented but relative axial movement of the two shafts is permitted. To prevent the adjacent ends of the shafts from abutting each other and causing noise during operation, biasing means is provided for urging the two shafts axially away from each other. The biasing means also serves to place a slight load on the bearings, which causes the bearings to run more quietly. This biasing means may take the form of a compression spring positioned between the adjacent ends of the shafts. An axial bore or cavity may be formed in one of the shafts at its end adjacent the other of the two shafts, and the spring may be positioned within this bore.

The construction shown in the drawing comprises a motor unit 10 and a gear unit 11. The gear unit 11 includes a hollow frame or housing 12 having integral feet 13 at its lower end for supporting the housing 12 on a suitable foundation (not shown). Holes 14 may be formed through the feet 13, through which bolts may extend for the purpose of securing the housing 12 to the foundation. One side of the housing 12 has a circular opening formed therein, which is enclosed by a circular cover 17, the latter being secured to the remainder of the housing 12 by a plurality of bolts 18. The interior of the housing 12 of course is accessible when the bolts 18 and the cover 17 are removed.

Within the housing 12 are rotatably mounted a pinion gear 21 and a worm gear 22 combination. The pinion gear 21 is secured to a shaft 16 which is supported by suitable bearings (not shown) and extends out of the housing 12 through a hole at the center of the cover 17. A keyway 20 may be formed in the shaft 16 for connecting to shaft 16 to a device to be driven.

The worm gear 22 of course meshes with the pinion gear 21 and is formed on a shaft 23 which extends at a right angle to the shaft 16. The shaft 23 is supported for rotation on the housing 12 by two ball bearing assemblies 24 and 26. The bearing 24 is located at one end of the shaft 23 and the bearing 26 is located between the other end 25 of the shaft 23 and the worm gear 22. Bosses 29 and 30 are formed in the interior of the housing 12 and support the bearings 24 and 26, respectively. The shaft 23 is adapted to be connected to the motor unit 10 and, to this end, extends out of the housing 12 through an opening 31 formed through the boss 30. The bearing 26 is positioned within the opening 31, and is held against axial movement by a retaining ring 32 on one side of the bearing 26 and an inwardly extending shoulder 33 of the boss 30 on the other side of the bearing 26. The retaining ring 32 is positioned in a groove 34 formed in the inner periphery of the opening 31.

The interior of the housing 12 may be partially filled with a lubricant during operation, and passageways 27 may be formed in the bosses 29 and 30 adjacent the sides of the bearings 24 and 26 away from the worm gear 22 for the purpose of lubricating the bearings 24 and 26.

To prevent the lubricant from flowing out of the housing 12 through the opening 31, an oil seal 36 is provided adjacent the outer end of the opening 31. The outer periphery of the seal 36 is secured to the inner periphery of the opening 31, and the inner periphery of the seal 36 engages a hardened sleeve 37 which is pressed on the outer periphery of the shaft 23. The sleeve 37 is a wear member which prevents the oil seal 36 from damaging the shaft 23. A garter spring 38 is preferably provided to hold the oil seal 36 tightly against the shaft 23.

The motor unit 10 comprises a housing including a cylindrical center portion 41, an outer end bell portion 42 and an adaptor or inner end bell portion 43. The portions 41, 42 and 43 of the motor unit 10 are held rigidly together as by four bolt and nut combinations 44 which extend from one end of the motor unit 10 to the other. The inner end bell 43 is secured to the housing 12 of the gear unit 12 by a plurality of bolts 46 which extend through holes 47 formed through the end bell 43 and are threaded into the housing 12 of the gear unit 11. The bolts 46 are preferably positioned on a circle having the axis of the shaft 23 as its center, and are spaced equal angular distances apart so that the end bell 43 may be rotatably adjusted relative to the housing 12. For example, if four bolts 46 are provided, the end bell 43 may be rotated in 90° increments. Such a construction is advantageous because an opening 48 in the end bell 43 for cooling the motor may be positioned such that dripping water, for example, cannot pass through the opening 48 and enter the motor interior.

Within the housing of the motor unit 10 is mounted a stator assembly 51 which is rigidly secured to the inner periphery of the central portion 41. A rotor assembly 52 including a shaft 53 is positioned within the stator assembly 36, and the shaft 53 is rotatably mounted at its outer or left end (FIG. 1) by a ball bearing assembly (not shown) mounted in a boss 54 formed on the outer end bell 42. At its inner end, the shaft 53 of the rotor 52 is connected to the shaft 23 of the gear box unit 11 and therefore is supported by the bearing 26. Thus, the two shafts 23 and 53 are rotatably supported by the three bearings 24, 26 and 53, which is advantageous because the use of three bearings eliminates the need for a flexible shaft coupling between the motor unit 10 and the gear unit 11.

The inner end bell 43 of the motor unit 10 has an opening 56 at its center through which the two shafts 23 and 53 extend. The two shafts 23 and 53 are positioned closely adjacent each other in end-to-end relation as shown in FIG. 1 and their adjacent ends are coupled together by means of a splined coupling 60 in the form of a sleeve. The adjacent portions of the two shafts 23 and 53 are splined as indicated at 61 and 62, and the coupling 60 fits over the splined portions of the two shafts and is preferably secured to the shaft 53 as by pressing the coupling 60 on the shaft 53. Longitudinal movement of the coupling 60 relative to the shaft 23 is permitted so that the coupling 60 may be slipped over the end of the shaft 23 when the two units 10 and 11 are being assembled.

As shown in FIG. 1, a space 63 normally exists between the adjacent ends of the two shafts 23 and 53, and the sleeve 37 is spaced from the coupling 60. Since the ball bearings 24, 26 and 54 normally permit some axial movement of the two shafts 23 and 53, there is a possibility that the adjacent ends of the shafts 23 and 53 might butt each other during operation and cause noise, but this possibility is eliminated by a biasing means which urges the two shafts 23 and 53 axially away from each other. This biasing means comprises a coiled compression spring 66 which is positioned between the adjacent ends of the two shafts and pushes them apart. An axially extending bore or cavity 67 may be formed in the end of the shaft 23 which is adjacent the shaft 53, and the spring 66 may be positioned within the bore 67. The bore 67 is preferably provided to simplify assembly of the two units 10 and 11 since the spring 66 will be held in position in the bore 67 while the coupling 62 is being slipped over the shaft 23.

During operation, the spring 66 preloads the three ball bearings 24, 26 and 54 and thereby reduces the amount of noise produced by them. The spring 66 also holds the two shafts 23 and 53 away from each other, thereby preventing the adjacent ends of the shafts from butting and causing noise. Thus, the provision of a biasing means in accordance with this invention for urging the two shafts away from each other results in substantially noise free operation of the apparatus.

I claim:

1. A motor-gear box combination, comprising a motor unit and a gear unit, each of said units including a rotatable shaft, means connecting said units together with said shafts in end-to-end relation, at least one of said shafts being mounted such that it is permitted limited axial movement, means coupling the adjacent ends of said shafts together such that relative rotative movement is prevented but relative axial movement is permitted, and biasing means operatively positioned relative to said two shafts for urging said two shafts axially away from each other, whereby the adjacent ends of said two shafts are prevented from butting and making noise, an axial bore being formed in the end of said shaft of said gear unit which end is adjacent said shaft of said motor unit, and said biasing means comprising a compression spring which is positioned within said bore and engages the end of said shaft of said motor unit, said coupling means comprising a sleeve with the ends of both of said shafts mounted within said sleeve, and said spring abutting said motor unit shaft within said sleeve.

2. A motor-gear box combination, comprising a motor unit and a gear box unit, each of said units including a rotatable shaft, means connecting said units together with said shafts in end-to-end relation, at least one of said shafts being mounted such that it is permitted limited axial movement, means coupling the adjacent ends of such shafts together such that relative rotative movement is prevented but relative axial movement is permitted, and biasing means operatively positioned relative to the two shafts for urging said two shafts axially away from each other, whereby the adjacent ends of said two shafts are prevented from butting and making noise, an axial bore being formed in the end of said shaft of said gear unit which is adjacent said shaft of said motor unit, and said biasing means comprising a compression spring which is positioned within said bore and engages the end of said shaft of said motor unit, said coupling means comprising a sleeve, and said gear unit including a seal and a wear sleeve for said seal mounted on said gear unit shaft adjacent said coupling sleeve, said sleeves being normally in axially spaced relation and said spring preventing said shafts from abutting each other and thereby preventing abutment of said sleeves.

References Cited by the Examiner

UNITED STATES PATENTS

| 235,679 | 12/1880 | Glover | 64—23 |
|---|---|---|---|
| 1,835,506 | 12/1931 | Linn | 64—9 |
| 2,544,862 | 3/1951 | Steibel | 287—108 X |
| 2,586,293 | 2/1952 | Birkigt | 74—425 |
| 3,005,357 | 10/1961 | Christian | 74—421.5 |

DAVID J. WILLIAMOWSKY, *Primary Examiner.*

L. H. GERIN, *Assistant Examiner.*